US012650835B2

(12) United States Patent
Karakos et al.

(10) Patent No.: US 12,650,835 B2
(45) Date of Patent: Jun. 9, 2026

(54) AUTOMATICALLY GENERATING HUMAN LANGUAGE CODE DESCRIPTIONS

(71) Applicant: RTX BBN Technologies, Inc., Cambridge, MA (US)

(72) Inventors: Damianos Karakos, Oro Valley, AZ (US); Stanislav Olegovich Ponomarev, Hillsborough, NC (US); Manaj Srivastava, Arlington, MA (US); Le Zhang, Waltham, MA (US)

(73) Assignee: RTX BBN TECHNOLOGIES, INC., Cambridge, MA (US)

( * ) Notice: Subject to any disclaimer, the term of this patent is extended or adjusted under 35 U.S.C. 154(b) by 79 days.

(21) Appl. No.: 18/339,744

(22) Filed: Jun. 22, 2023

(65) Prior Publication Data

US 2023/0418596 A1     Dec. 28, 2023

Related U.S. Application Data

(60) Provisional application No. 63/354,935, filed on Jun. 23, 2022.

(51) Int. Cl.
| | |
|---|---|
| *G06F 8/74* | (2018.01) |
| *G06F 8/73* | (2018.01) |
| *G06F 11/362* | (2025.01) |
| *G06F 21/56* | (2013.01) |
| *G06F 21/57* | (2013.01) |
| *G06N 3/045* | (2023.01) |
| *G06N 3/08* | (2023.01) |

(52) U.S. Cl.
CPC ................. *G06F 8/74* (2013.01); *G06F 8/73* (2013.01); *G06F 11/3636* (2013.01); *G06F*

*21/577* (2013.01); *G06N 3/045* (2023.01); *G06N 3/08* (2013.01); *G06F 21/563* (2013.01)

(58) Field of Classification Search
CPC . G06F 8/73; G06F 8/74; G06F 11/302; G06F 11/3636; G06F 21/563; G06F 21/577; G06N 3/08; G06N 3/0895; G06N 3/09; G06N 3/091; G06N 3/092; G06N 3/094; G06N 3/096; G06N 3/098; G06N 3/0985
See application file for complete search history.

(56) References Cited

U.S. PATENT DOCUMENTS

| | | | |
|---|---|---|---|
| 2022/0075778 A1 | 3/2022 | Dickie et al. | |
| 2022/0245056 A1* | 8/2022 | Clement | .............. G06F 11/0778 |

OTHER PUBLICATIONS

Abbasli, Nazrin, et al., Log and Execution Trace Analytics System, International Conference on INnovations in Intelligent Systems and Applications (INISTA), Aug. 2021, 7 pages, [retrieved on Apr. 14, 2025], Retrieved from the Internet: <URL:http://ieeexplore.ieee. org/>.*

(Continued)

*Primary Examiner* — Geoffrey R St Leger
(74) *Attorney, Agent, or Firm* — CANTOR COLBURN LLP

(57) ABSTRACT

Devices, systems, and methods for executable binary file description are provided. A method can include generating or identifying an execution trace for the executable binary file. The method can include operating, based on the execution trace, a transformer model that generates a human language program description of the execution trace.

19 Claims, 7 Drawing Sheets

(56)         References Cited

OTHER PUBLICATIONS

Vaswani, Ashish, et al., "Attention is All You Need", 31st Conference on Neural Information Processing Systems (NIPS), arXiv:1706.03762v5 [cs.CL], (Dec. 6, 2017), 15 pgs.

Katz, et al. "Using Recurrent Neural Networks for Decompilation",2018 IEEE 25th International conference on software Analysis, Evolution and reengineering (SANER), pp. 346-356, IEEE, 2018.

Rahali, et al. "Malbert: Using Transformers for Cybersecurity and Malicious Software Detection", Available at https://arxiv.org/abs/2103.03806, A Preprint-Mar. 8, 2021, 10 pages.

\* cited by examiner

```
/* This program takes age input from the user. It stores the input in the age variable and
prints the value of the age variable using printf*/

...
int main() {
    int age;  //create integer variable "age"

printf("Enter the age: ");  //prompt user for age
    scanf("%d", &age);  //save entered age to age variable printf("Age = %d", age);  //print the age variable to the screen return 0;
}
```

400

| PROGRAM COUNTER | INSTRUCTION SEQUENCE EXECUTED | STATE |
|---|---|---|
| 0X401751 | XOR EAX, EAX | ; EAX = 0 |
| 0X401753 | MOVE RDI, RSP | ; RDI = 0X7fffffffded0 |
| 0X401756 | REP STOS QWORD PTR ES:[RDI], RAX | ; RDI = 0X7fffffffded0, RAX=0 |
| 0X401756 | REP STOS QWORD PTR ES:[RDI], RAX | ; RDI = 0X7fffffffded8, RAX=0 |
| ... | ... | ... |
| 0X401756 | REP STOS QWORD PTR ES:[RDI], RAX | ; RDI = 0X7fffffffdfd0, RAX=0 |
| 0X401759 | MOV EAX, 0X1 | |
| 0X40175e | XCHG AX, AX | ; AX = 1 |
| 0X401760 | MOV EDX, EAX | ; EAX = 1 |
| 0X401762 | AND EDX, 0X3f | ; EDX = 1 |
| 0X401765 | ADD DWORD PTR [RSP+RDX*4], EAX | ; [0X7fffffffded0 + 1 * 4] = 1 |
| 0X401768 | ADD EAX, 0X1 | ; EAX = 1 |
| 0X40176b | CMP EAX 0X800 | ; ZF = 0 |
| 0X401770 | JNE 0X401760 | |
| 0X401760 | MOV EDX, EAX | ; EAX = 2 |
| ... | ... | ... |

442

444

440

116
TRACE

EMBED — 446

EMBED — 448

EMBED — 450

CONCATENATE — 452

ENCODE — 454

DECODE — 456

HUMAN LANGUAGE DESCRIPTION — 118

GENERATE OR IDENTIFY AN EXECUTION TRACE FOR THE EXECUTABLE BINARY FILE

552

OPERATE, BASED ON THE EXECUTION TRACE, A TRANSFORMER MODEL THAT GENERATES A HUMAN LANGUAGE PROGRAM DESCRIPTION OF THE EXECUTION TRACE

700

AUTOMATICALLY GENERATING HUMAN LANGUAGE CODE DESCRIPTIONS

CLAIM OF PRIORITY

This patent application claims the benefit of priority to U.S. Provisional Application Ser. No. 63/354,935, filed Jun. 23, 2022, which is incorporated by reference herein in its entirety.

TECHNICAL FIELD

Embodiments discussed herein regard devices, systems, and methods for generating human language program code descriptions based on an execution trace of the program code.

BACKGROUND

Current state-of-the-art approaches for generating a program description for a binary file include using formal methods to discover primitive properties such as "does this code even execute?". Formal methods in cyber security require long compute times and are able to process a very limited subset of computable logic. Cyber analysts have hand-crafted heuristics that help them search for key functionality and state of the art decompilers generate program code (like that produced by a software developer) from machine code. These formal approaches waste time by analyzing irrelevant functions and their output requires human analysis to be understood. Further, a fractal-like structure of code obstructs accurate sequence-based analysis of the code. Such sequential analysis can include replacing calls and jumps with a single label. All of these issues make the formal methods unreliable or too resource-intensive for broadly applicable program understanding techniques.

The National Security Administration (NSA) has generated a program called "Ghidra" that was built for reverse engineering a program from an executable binary file. Ghidra is able to open executable files and keep track of a multitude of different interrelated logic models that represent the content of an executable file. However, even with these capabilities, Ghidra requires analysis strategy, machine code knowledge, and a plethora of reverse engineering experience to be useful as a reverse engineering tool.

Another current approach to understand how functions work is to first find identifiable data types in memory—human readable strings are often the primary target as those are used to interact with humans for all systems. Then, after the string location is known, Ghidra can cross-reference all functions and quickly tell the analyst which functions take which strings as arguments or use them as constants. After an analyst knows enough datatypes used in a function, they can start applying their programming knowledge to find new data types (especially structures) as well as summarizing what a function does. This approach is cyclical in nature, having an analyst look over the same function multiple times until enough data-types and context are recovered to understand what a function does. This is the largest time-sink in current reverse engineering workflow, and modern binaries contain hundreds to thousands of functions. It is common to spend weeks analyzing a single piece of malware.

BRIEF DESCRIPTION OF THE DRAWINGS

FIG. 4 shows, by way of example, a diagram of a lower-level view of an embodiment of a transformer model.

DETAILED DESCRIPTION

Computer program understanding is a wide domain that has been funded by governmental, academic, and private sectors alike. Academic research generally revolves around formal method-based solutions that approach the boundary of the halting problem—no automation can analyze itself to determine if it halts or not. Both the government and private sectors are interested in program understanding for understanding operation of malicious code for which documentation is rarely, if ever, provided.

Embodiments leverage a sequence-to-sequence encoder to translate an execution trace into a function description. Effective understanding of machine code, an executable binary file, can provide invaluable insights and assistance in updating or maintaining code (e.g., legacy code or code for which operation is unknown), or verifying code security. Cyber analysts are frequently presented with an executable file, the functionality of which is unknown, and they want to know either a simple description of the executable or if the executable contains certain properties. This is sometimes called the "program understanding" (PU) problem. Although there have been several Defense Advanced Research Projects Agency (DARPA) programs that helped cyber analysts determine functionality of code, none have succeeded enough to mark the PU problem solved. Furthermore, machine learning (ML), and Deep Learning (DL) tools, have barely been explored for binary executable program understanding. For analysts, the natural description of logic is often the human language. Despite great success of DL in tackling problems in human language understanding, effective use of DL for program understanding is still missing.

Embodiments regard a Code Interpretation using Deep lEarning Representations (CIDER) system. CIDER generates a human-language description of machine code (an executable file). CIDER allows cyber analysts to more quickly understand the functionality or purpose of an executable file of which the functionality can be unknown. CIDER can use a transformer translation model that is able to translate (e.g., at runtime or another time) execution traces into human language. CIDE can use a transformer (e.g., attention sequence-to-sequence translation) architecture to summarize functions of a program or an overall program into an output human language description of machine code. CIDER can use program traces, sometimes called execution traces, which describe a path through code, instead of static code to train a CIDER model. The CIDER output can be provided on a function-by-function basis.

CIDER allows cyber analysts to quickly understand the nature of unknown executables, such as by utilizing a transformer translation model that is able to translate execution traces into a human language. Reference will now be made to the FIGS. to describe further details of embodiments.

Figure 1:
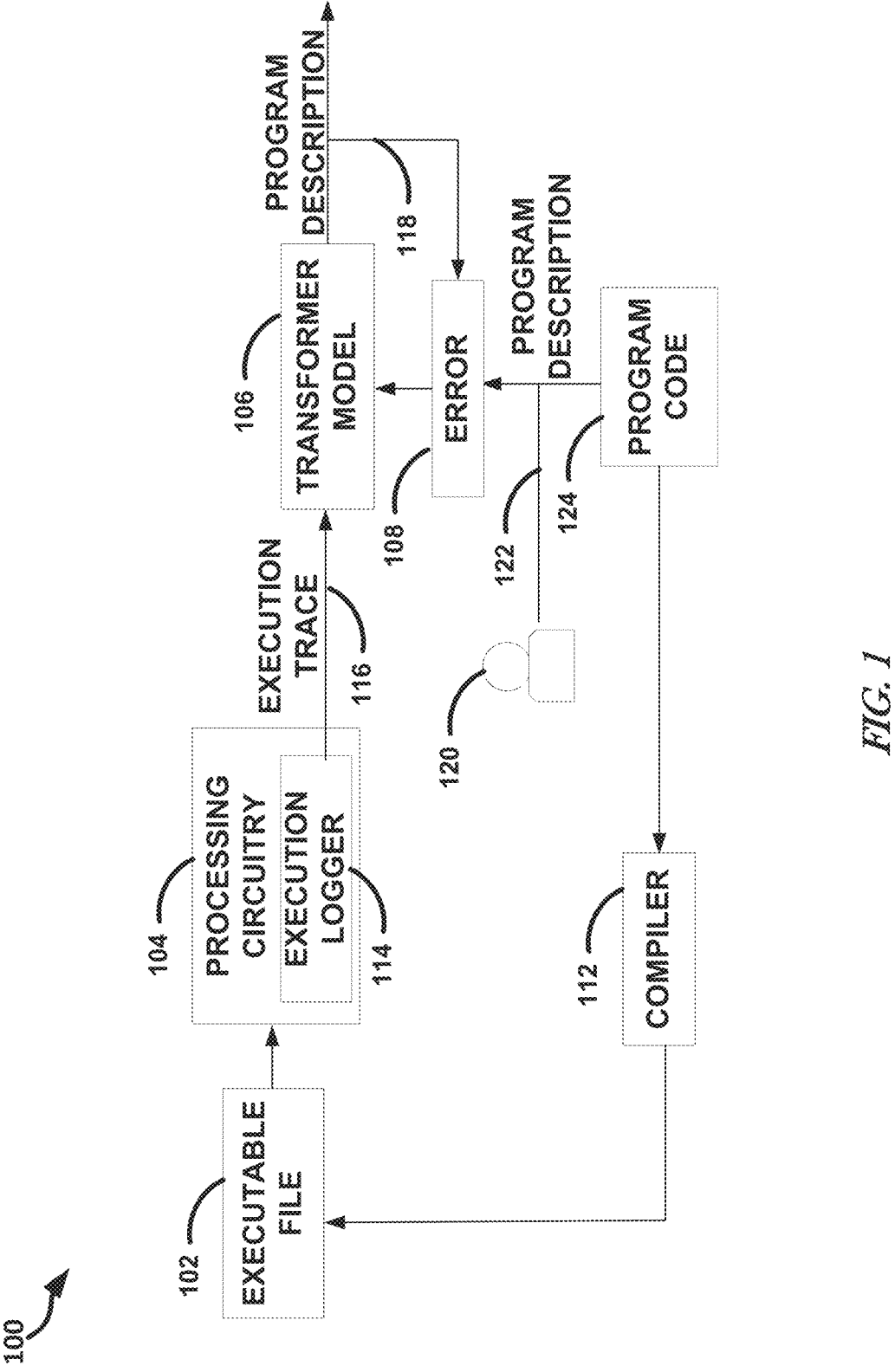
FIG. 1 illustrates, by way of example, a block diagram that provides a high-level view of an embodiment of a human language description generation system.

FIG. 1 illustrates, by way of example, a block diagram that provides a high-level view of an embodiment of a CIDER system 100. The system 100 as illustrated includes an executable file 102 that is executed by processing circuitry 104. Some aspects of the processing circuitry 104 executing the executable file 102 are recorded by an execution logger 114. The execution logger 114 generates an execution trace 116 that memorializes the aspects of executing the executable file 102. A transformer model 106 operates on the executing trace 116 to generate a human-language program description 118. The program description 118 is the output of the system 100 at runtime. At training time, however, a different between the program description 118 and an actual program description 122 can be provided to an error operator 108. The program description 122 can be generated by a subject matter expert 120 or can be identified in and extracted from program code 124. The program code 124 is generated by a developer (typically a team of software developers). A compiled version of the program code 124 that is executable by the processing circuitry 104 is the executable file 102.

The executable file 102 contains binary machine code that has been compiled, by a compiler 112, from the program code 124. The executable file 102 contains an encoded sequence of instructions that the processing circuitry 104 can execute directly. Executable files most famously have a file extension of .EXE but can include other extensions, such as .BAT, .COM, .CMD, .INF, .IPA, .OSX, .PIF, .RUN, and .WSH, among many others. The instructions of the executable file indicate to the processing circuitry 104 operations to be performed by hardware of a computer. Executable files communicate directly with the computer, giving it a set of instructions to run. This is contrasted with data files which must have another program interpret or parse them before the computer can use them.

The processing circuitry 104 executes the executable file 102. The processing circuitry includes electric or electronic components configured to perform operations indicated by machine code of the executable file 102. The electric or electronic components can include one or more resistors, transistors, capacitors, diodes, inductors, power supplies, memory devices, amplifiers, digital to analog converters, analog to digital converters, logic gates (e.g., AND, OR, XOR, negate, buffer, or the like), switches, multiplexers, processing units (e.g., a central processing unit (CPU), an application specific integrated circuit (ASIC), a graphics processing unit (GPU), a field programmable gate array (FPGA), or the like), a combination thereof, or the like.

The execution logger 114 can monitor operation of the processing circuitry 104 and record aspects of the processing circuitry 104 execution of the executable file 102 in an execution trace 116. The execution logger 114 can record a program counter value, an instruction executed at the program counter value, and a state of relevant variables at the program counter value. The program counter is a register in the processing circuitry 104 which holds a memory address of a next instruction to be executed by the processing circuitry 104. The program counter acts as a digital counter and tracker for instruction execution. Other names for program counter include instruction counter, instruction pointer, instruction address register, and sequence control register. A relevant variable is one that is referenced by an instruction being executed. The state of a variable is a value of that variable at the time of execution. The value can be a number, character(s), a combination thereof, or the like.

The transformer model 106 is a sequence-to-sequence transformer. The transformer model 106 receives the execution trace 116 as input and generates a human-language description of the functionality of the executable file 102 (the program description 118) as an output. Current state-of-the-art sequence-to-sequence transformers include an encoder and a decoder. The encoder and decoder can be comprised of neural networks (NNs). The encoder can be coupled to the decoder through an attention network. In an attention network some parts of input (from the encoder) are enhanced while other parts are diminished. The enhancing or diminishing of the parts is determined based on context. More details regarding the transformer model 106 are provided elsewhere.

The program description 118 can be generated at one or more of multiple levels of description. The program includes instructions that are parts of functions. The functions, in aggregate, form the functionality of the program. In some examples, the program description 118 can describe function-level operation of the program code 124. In some examples, the program description 118 can describe the functionality of an aggregation of the operations of the functions of the program. The program description 122 can be from the program code 124 itself, from documentation that supports the program code 124 (e.g., a library file, a "how-to-use" file, a description of the program code 124 from a website, a combination thereof, or the like.

Figure 2:
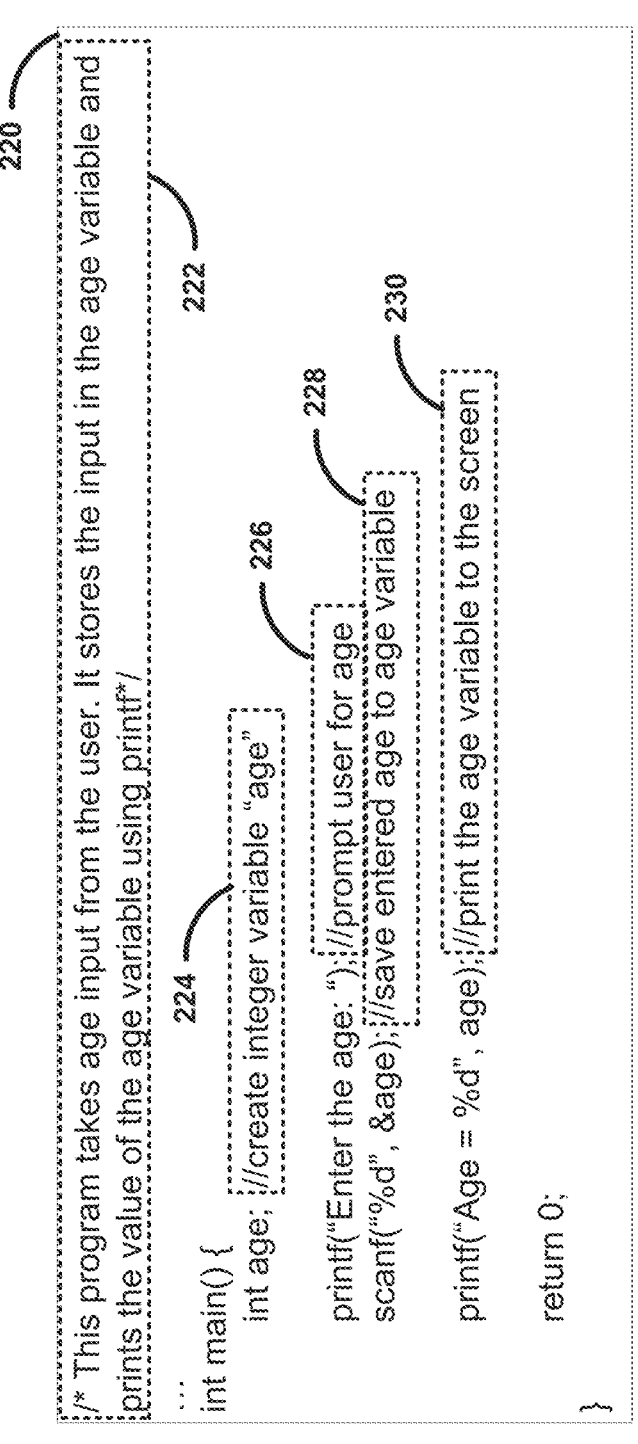
FIG. 2 illustrates, by way of example, a diagram of an embodiment of some program code.

As a developer generates the program code 124, they can include comments in the code. The comments can form an actual program description 122. The program description 118 can be considered to be inferred or an informed guess. The comments, like the program description 118, can be generated at one or more of multiple levels of description. FIG. 2 illustrates two of the possible comment levels.

During test or production of the transformer model 106, the transformer model 106 is tested "blind" on new program code 124 that was not used in training the transformer model 106. The error operator 108 and program description 122 are not used during test or production of the transformer model 106.

FIG. 2 illustrates, by way of example, a diagram of an embodiment of some program code 220 (an instance of the program code 124). The program code 220 includes a program level comment 222 and some function level comments 224, 226, 228, 230. The program level comment 222 explains the functionality of the program code 220 at a high level. The function level comments 224, 226, 228, 230 explain the functionality of respective functions in the program code 220. The function level comments 224, 226, 228, 230 can, upon review by the SME 120, be interpreted to add up to the program level comment 222. The program description 122 can include the program level comment 222, function level comments 224, 226, 228, 230, a description from the SME 120, or a combination thereof. The comments 222, 224, 226, 228, 230 can be identified, such as by a text search of the program code 220 for symbols indicating a beginning and end of the comment 222, 224, 226, 228, 230 and the text in between the symbols can be extracted as the program description 122.

Figure 3:
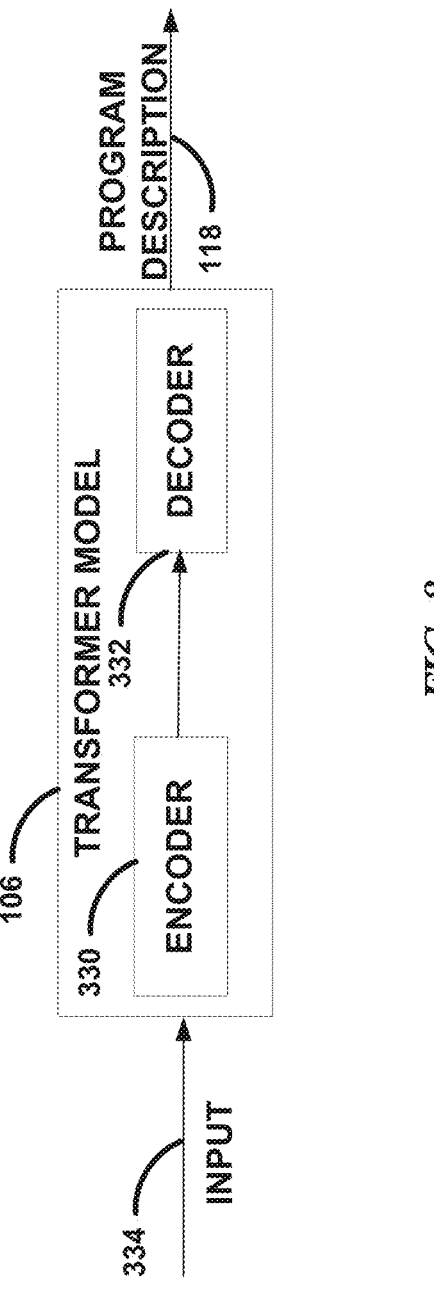
FIG. 3 illustrates, by way of example, a diagram of an embodiment of the transformer model.

FIG. 3 illustrates, by way of example, a diagram of an embodiment of the transformer model 106. The transformer model 106 as illustrated includes an encoder 330 that operates on input 334 and provides a token sequence representation of the input 334 to a decoder 332. The decoder 332 converts the token sequence to the program description

118. The encoder 330 and decoder 332 can each have a multi-head attention architecture. In a multi-head attention architecture, multiple attention units provide outputs to respective feed forward networks (FFN). One or more of the encoder 330 or decoder 332 can include a positional encoding that indicates a position of a given token in a sequence. The position information provided by the encoding helps inform the attention unit what features of the token sequence are most salient.

Referring back to FIG. 1, the error operator 108 can generate an error value based on a loss function. The error value can inform a gradient that is used to alter weights of components (e.g., neurons or other parameters) of the transformer model 106. The loss function is commonly a cross entropy loss function in sequence-to-sequence transformer models.

FIG. 1 shows how using an execution trace 116 lets a transformer model 106 identify salient features (e.g., data types) for reconstructing a human language program description 118. The most succinct human language description of a known function is the function name, along with names and uses of data types such a function might process. The transformer model 106 performs machine translation (MT) of program comments to the program description 118. The transformer model 106 can be trained based on (execution trace 116, program description 122) pairs. The execution trace 116 is chosen to allow computation over the fractal-like structure of the program code 124. In the execution trace 116, the jumps and calls of a binary can be removed or replaced with specific tokens forming a linear (non-recurring) sequence of instructions. To obtain training pairs, one can leverage enormous amounts of human-written descriptions in public-domain code repositories such as Google Code Project private repositories, GitHub, a combination thereof, or the like, among many others, projects to generate execution traces 116 from the corresponding executables.

The system 100 automates translating the program code 124 to the program description 118. Embodiments us a strategy of offloading software reverse engineering to a transformer model 106 that is able to learn the function logic found in execution traces 116 of black box binaries executable files 102. Some examples will still benefit from human analysts to crack understanding some executable files, but many programs and approaches shared between various executable files 102 are very similar—allowing the system 100 to quickly expand summarized data types and function logic before the SME 120 even starts their analysis. The system 100 cuts the number of functions the SME 120 needs to analyze by at least 50%, drastically reducing the amount of analysis that needs to be performed on the whole binary executable file 102 in understanding the functionality thereof. Introduction of summarized data types and function logic will additionally help the analyst with the other 50% of functions as long as those functions partially use newly recognized logic and data.

The system 100 can be operated as a plugin, standalone software, or a part of a development platform. The system 100 will allow cyber analysts to keep using their current strategies and known tools. The system 100 provides cyber analysts with additional information about the executable file 102 they are exploring. The system 100 reduces the analyst time needed to spend on a given binary executable file 102. Optionally, the system 100 can provide a human language description, along with the program traces 116, variable and function names used in the program code 124.

Machine learning (ML) performed by the transformer model 106 often requires large, labeled datasets to be accurate. Cyber datasets, especially labeled ones, are notoriously hard to come by due to long analysis times needed to label binary executable files 102. A training dataset for the transformer model 106 include program samples found on GitHub, Google's Code Jam, private program samples, synthetic dataset entries generated by GitHub Copilot (transformer model that generates high-level code given human description). We will download public sources of various compiled (e.g., C, C++, Rust, or the like) command line programs, that have either standard build environments, such as automake or cmake, or have pre-defined continuous integration pipelines. Functions in those projects that have a documented functionality summary (docstring) can be identified and used as a program description 122. Finally, a core dataset can contain buildable executable files 102 as well as a map of functions in those executables to the functionality summary program description 122.

Execution traces 116, rather than machine code (the executable file 102), can reduce the computational complexity posed to the transformer model 106. The execution traces 116 further reduce the dimensionality the feature space. To automatically generate program execution traces 116 a fuzzer—a tool that quickly generates inputs required to run previously built programs can be used. American Fuzzy Lop (AFL) is a common fuzzer that operates on an instrumented binary which it can instrument by tapping into the building process and substituting common compilers with its own. The scraped projects need to be buildable to well-known built systems—systems that AFL can utilize to introduce instrumentation needed to generate inputs necessary for program execution. To gain the fidelity of the execution trace 116 needed by the system 100 one can use tools, such as the execution logger 114, to quickly gain the needed information.

Collected execution traces 116 and program description 122 can be put together to form a series of input-output examples that can be used to train the transformer model 106. The execution traces 116 provide a non-recurrent representation of logic. As such, computations needed to perform recurrent calls and address computations can be statically identified and removed from the feature set, thus removing the information of where a logic is from what the logic does. Removing addressing information also lets the system 100 quickly reduce the dimensionality of its feature-set because addresses in machine code appear often and are spread between $2^0$ and $2^{64}$ on a 64-bit CPU.

The transformer model 106 has become the cutting-edge method for sequence generation and representation learning in many domains with state-of-the-art results, including natural language processing (NLP). The system 100 views the code interpretation problem as a sequence-to-sequence translation task: given an execution trace 116 representation X of program code 124, produce a corresponding high level program description 118 Y in natural language. Each execution trace 116 path through the program code 124 can gets its own program description 122 for a training stage (similar to large documents for translation models) while the trained model will concentrate on descriptions of smaller code blocks. The transformer model 106 models this problem through the encoder-decoder architecture illustrated in FIG. 3. The encoder 330 takes as input, a tokenized representation of an embedding representation of the program execution trace 116 X. The execution trace 116 can include a sequence of symbols (including program counter 440, operation code 442, and state data 444), and transforms the execution trace 116 X into a sequence of vectors in a non-linear space. The sequence of vectors is then decoded autoregressively by the decoder 332, one token at a time, until an end-of-document token is produced.

FIG. 4 shows, by way of example, a diagram of a lower-level view of an embodiment of a transformer model 400. The transformer model 400 can be the transformer model 106 after training. The input is a program execution trace 116, represented as an instruction sequence 442, along with the program counter 440, and register values for each instruction (state 444). The execution trace sequence is converted into respective embedding sequences by respective embedders 446, 448, 450. The embedders 446, 448, 450 map the respective program counter 440, instruction sequence 442, and state 444 to a vector in the embedding space. Since the values of the program counter 440 and some registers (state 444) describe the memory address of instructions or data and are runtime-dependent, they can be encoded into relative positions (as is done in some NLP applications). The resulting positional embedding can be added to the trace embedding as final input to the model (output of the concatenate operation 452). Next, the transformer encoder 454 projects the input sequence into an encoded representation in a higher-dimensional space (relative to the dimensionality of the input to the encoder 454) and passes that to the transformer decoder 456 to be decoded into an output sequence in natural language, the program description 118. The encoder 454 and the decoder 456 represent trained versions of the encoder 330 and the decoder 332, respectively.

The model 106 can be updated based on a cross-entropy next-token prediction loss commonly used for language modeling tasks enforced by the error operation 108. The training data includes <execution trace 116, program description 122> data pairs. While it is possible to train a transformer model 106 from scratch from the data pairs only, studies show that pre-training the transformer model 106 in an unsupervised way, even on an out-of-domain dataset, can significantly improve the model 106 converging speed. One can thus pre-train the encoder 330 on a large amount of program execution traces 116 generated from the binary execution files 102. Similarly, the decoder 332 can be pre-trained on a large amount of program descriptions 122. The pre-trained transformer model 106 can then be fine-tuned based on the data constructed for specific program description.

Malware applications often use design patterns different from benign applications available on public repositories. However, few public repositories contain actively malicious code. Many malicious applications do not perform strict input parsing and are instead attempting to establish a foothold on the system they are executed on. On one hand, this allows one to ignore fuzzing and capture a single execution trace for malware that will not check any special input conditions, on the other hand one must make sure to maintain strict compliance with regulations and perform trace extraction (execute the execution logger 114) in a separate lab space that ensures separation of malware from the rest of the world. After extraction and annotation of malicious traces, the system 100 can maintain applicability to malicious binary executables 102 by re-training a previously developed model on such data pairs.

Part of generating the program description 118 means describing data formats that the logic operates on or summarizing the logic further into single words or phrases. This task is similar to variable and function naming tasks. Ghidra, a tool from the NSA, is able to decompile some machine code subsets, but it is not able to create reasonable names for its variables or functions. Having a contextually-relevant name of a variable can help the SME 120 further reduce their analysis time. Some variable names, for example, have historically been used to represent certain concepts—for example variable name i has been historically used to represent iteration, while both i, j have been used to represent iterating over a matrix. The system 100 can suggest variable and function names created during a Ghidra decompilation stage to add understanding to the program description 118.

The system 100 that can provide accurate program descriptions 118 for at least 50% of the reference descriptions at least 90% correctly. "Correctly" does not necessarily require that the system 100 outputs the same exact description verbatim, as that would be unnecessarily strict (there are multiple ways to express the same thing in human language). To allow some flexibility, one can consider using performance metrics that are commonly used in Human Language Technology to compare natural language strings (e.g., system-generated, and human-generated sentences). For instance, BLEU, WER and TER are used for evaluating machine translation systems, and ROUGE is used for evaluating document summarization systems. Almost all of these metrics are weighted functions of precision and/or recall, namely, the proportion of words/phrases in the system-generated program description 118 that exist in the reference program description 122, and the proportion of words/phrases in the reference program description 122 that exist in the system-generated program description 118, respectively. The order with which the salient terms appear in the descriptions may not be as significant as when evaluating NLP tasks.

Although the aforementioned metric gives an indication of how good the system 100 is at detecting/missing the most salient features or functionality of a computer program, the usefulness of the system 100 to the end analyst can be more important. For the system 100 to be useful, it can be advantageous to satisfy various requirements:

1. Metric: accuracy. The transformer model 106 should generate program descriptions 118 that help the SME 120 make decisions. For example, it can be important to be able to decide whether the program code 124 is malicious or contains bugs or is easily exploitable. For example, a requirement for the system 100 can be to help the SME 120 improve the detection of malware so that the number of misses decreases by a specified percentage (e.g., 50%) with only a specified percentage (e.g., 10%) increase in the number of false alarms.

2. Metric: computation time. The transformer model 106 can provide an analysis time speedup by a specified factor (e.g., 10000 or other factor) compared to the time it would take a human to generate a human-readable description of the executable (of the same quality) without the system 100. Generating human-readable descriptions allows the SME 120 to quickly filter out the uninteresting code in a large collection and spend the bulk of his time in more deeply analyzing the code that has the highest level of importance.

3. Metric: coverage. As stated previously, the system 100 can aim to provide coverage of a specified amount of a codebase where the accuracy is high (human level description matches trace logic), but especially with malware it is expected to have 20% of the trace where the transformer architecture is unable to provide useful human-level description.

For these reasons, the transformer model 106 can have a human-centered evaluation, where the SME 120 can use the system 100 program description 118 to help them decide what code to focus on for malware detection and vulnerability analysis within a restricted time-frame (e.g., one week).

While conceptually similar to the language translation task, the problem of mapping program traces to natural language poses challenges that do not exist in the language modeling and generation domain. A typical program trace, even generated from a short program, can be orders of magnitude longer than the corresponding human description. This is challenging because in a transformer model the required time and memory grows quadratically with the sequence length. To address this challenge, we plan to use a sparse variant of Transformers that can model sequences tens of thousands of time-steps long. This is needed so that the encoder 330 can handle the very long program execution trace 116. The encoded representation that is fed into the decoder 332 compresses the salient short- and long-distance relationships of the trace 116 and is efficiently decoded into human language.

A more useful trace 116 can apply a filter to display information about events in the program. For example, one can trace each call to a function, every member function of a given name, every function in a class, or each exit from a function. One can also trace changes to a variable.

Figure 5:
FIG. 5 illustrates, by way of example, a block diagram of an embodiment of a method for generating a human language description of a program.

FIG. 5 illustrates, by way of example, a block diagram of an embodiment of a method 500 for executable binary file description. The method 500 as illustrated includes generating or identifying an execution trace for the executable binary file, at operation 550; and operating, based on the execution trace, a transformer model that generates a human language program description of the execution trace, at operation 552.

The method 500 can further include, wherein the execution trace includes a program counter sequence and the transformer model includes a first embedder that generates an embedding representation of the program counter sequence. The method 500 can further include, wherein the execution trace further includes an executed instruction sequence and the transformer model includes a second embedder that generates an embedding representation of the executed instruction sequence. The method 500 can further include, wherein the executed instruction sequence includes operation codes for machine code instructions executed in executing the executable binary file. The method 500 can further include, wherein the execution trace further includes a state of relevant variables. The method 500 can further include, wherein the state of relevant variables includes values of variables input into instructions of the execution instruction sequence.

The method 500 can further include reverse engineering the executable binary file based on the human language program description. The method 500 can further include training the transformer model using a training dataset comprising (execution trace, program description) pairs. The method 500 can further include, wherein the program description of the (execution trace, program description) pairs are comments from program code used to generate the executable binary file. The method 500 can further include, wherein the comments are function level comments, program level comments, or a combination thereof.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as object recognition, or the like. The transformer model 106, 400 can include one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 6:
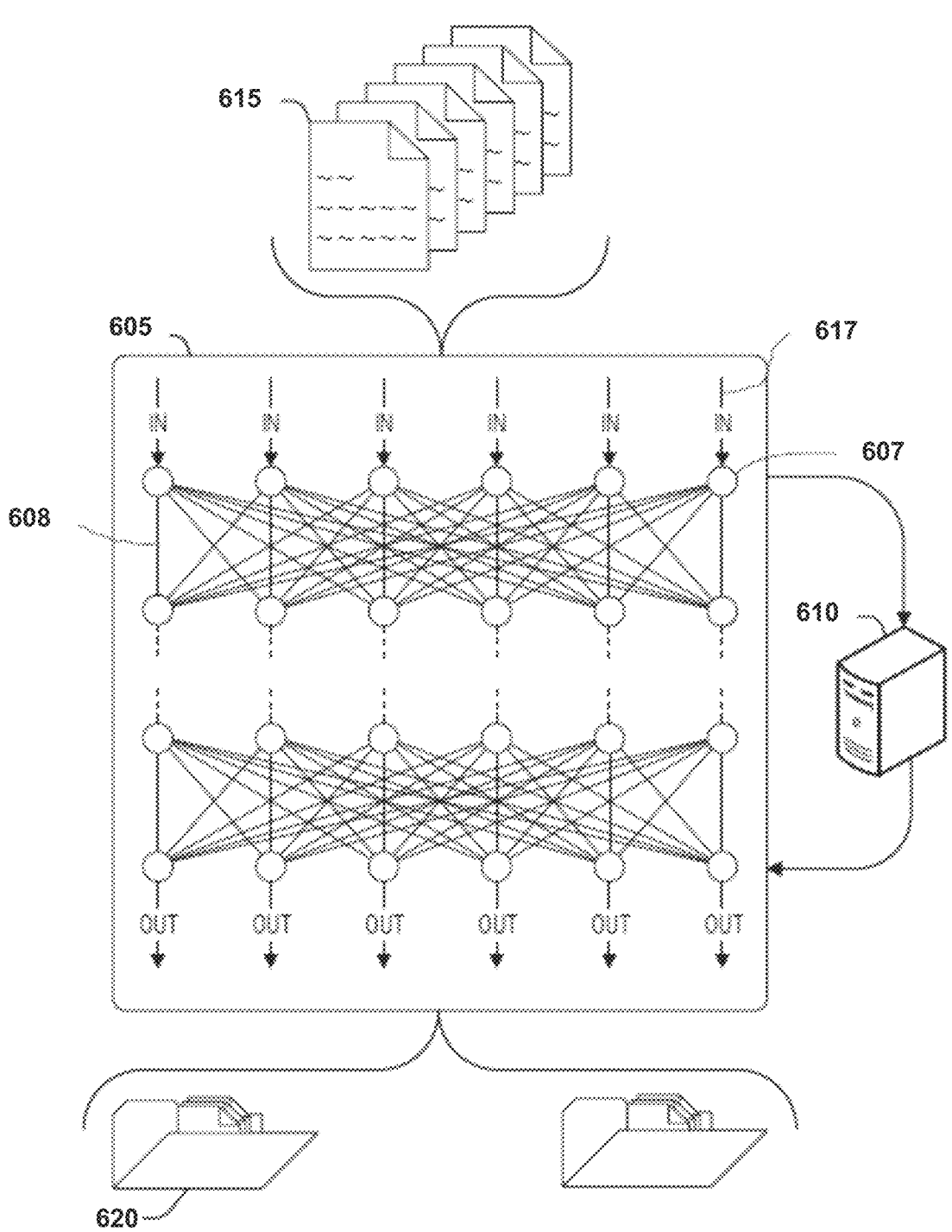
FIG. 6 is a block diagram of an example of an environment including a system for neural network training.

FIG. 6 is a block diagram of an example of an environment including a system for neural network training. The system includes an artificial NN (ANN) 605 that is trained using a processing node 610. The processing node 610 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 605, or even different nodes 607 within layers. Thus, a set of processing nodes 610 is arranged to perform the training of the ANN 605.

The set of processing nodes 610 is arranged to receive a training set 615 for the ANN 605. The ANN 605 comprises a set of nodes 607 arranged in layers (illustrated as rows of nodes 607) and a set of inter-node weights 608 (e.g., parameters) between nodes in the set of nodes. In an example, the training set 615 is a subset of a complete training set. Here, the subset may enable processing nodes with limited storage resources to participate in training the ANN 605.

The training data may include multiple numerical values representative of a domain, such as an image feature, or the like. Each value of the training or input 617 to be classified after ANN 605 is trained, is provided to a corresponding node 607 in the first layer or input layer of ANN 605. The values propagate through the layers and are changed by the objective function.

As noted, the set of processing nodes is arranged to train the neural network to create a trained neural network. After the ANN is trained, data input into the ANN will produce valid classifications 620 (e.g., the input data 617 will be assigned into categories), for example. The training performed by the set of processing nodes 607 is iterative. In an example, each iteration of the training the ANN 605 is performed independently between layers of the ANN 605. Thus, two distinct layers may be processed in parallel by different members of the set of processing nodes. In an example, different layers of the ANN 605 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 607 (e.g., neurons) are trained independently. In an example, the nodes are trained on different hardware.

Figure 7:
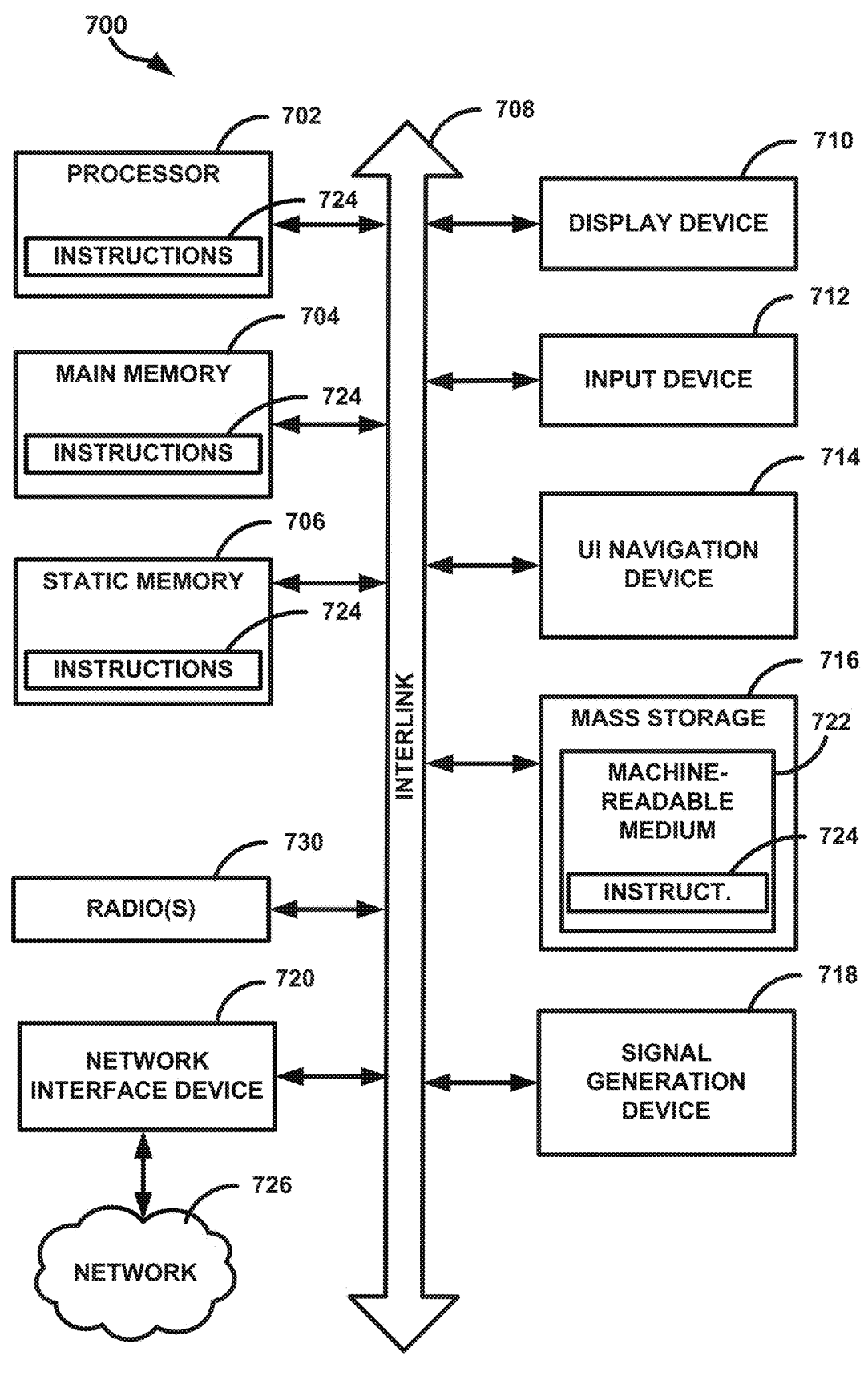
FIG. 7 illustrates, by way of example, a block diagram of an embodiment of a machine in the example form of a computer system within which instructions, for causing the machine to perform any one or more of the methodologies discussed herein, may be executed.

FIG. 7 illustrates, by way of example, a block diagram of an embodiment of a machine in the example form of a computer system 700 within which instructions, for causing the machine to perform any one or more of the methodologies discussed herein, may be executed. One or more of the processing circuitry 104, execution logger 114, transformer model 106, error operation 108, compiler 112, encoder 330, decoder 332, embedder 446, 448, 450, concatenate operation 452, encoder 454, decoder 456, method 500 or other device, component, operation, or method discussed can include, or be implemented or performed by one or more of the components of the computer system 700. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a mass storage unit 716, a signal generation device 718 (e.g., a speaker), a network interface device 720, and a radio 730 such as Bluetooth, WWAN, WLAN, and NFC, permitting the application of security controls on such protocols.

The mass storage unit 716 includes a machine-readable medium 722 on which is stored one or more sets of instructions and data structures (e.g., software) 724 embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a method for executable binary file description, the method comprising generating or identifying an execution trace for the executable binary file, and operating, based on the execution trace, a transformer model that generates a human language program description of the execution trace.

In Example 2, Example 1 further includes, wherein the execution trace includes a program counter sequence and the transformer model includes a first embedder that generates an embedding representation of the program counter sequence.

In Example 3, Example 2 further includes, wherein the execution trace further includes an executed instruction sequence and the transformer model includes a second embedder that generates an embedding representation of the executed instruction sequence.

In Example 4, Example 3 further includes, wherein the executed instruction sequence includes operation codes for machine code instructions executed in executing the executable binary file.

In Example 5, at least one of Examples 3-4 further includes, wherein the execution trace further includes a state of relevant variables.

In Example 6, Example 5 further includes, wherein the state of relevant variables includes values of variables input into instructions of the execution instruction sequence.

In Example 7, at least one of Examples 1-6 further includes reverse engineering the executable binary file based on the human language program description.

In Example 8, at least one of Examples 1-7 further includes training the transformer model using a training dataset comprising (execution trace, program description) pairs.

In Example 9, Example 8 further includes, wherein the program description of the (execution trace, program description) pairs are comments from program code used to generate the executable binary file.

In Example 10, Example 9 further includes, wherein the comments are function level comments, program level comments, or a combination thereof.

Example 11 includes a non-transitory machine-readable medium including instructions that, when executed by a machine, cause the machine to perform the method of one of Examples 1-10.

Example 12 includes a system comprising processing circuitry, memory including instructions that, when executed by the processing circuitry, cause the processing circuitry to perform operations for executable binary file description, the operations comprising the method of one of Examples 1-10.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for executable binary file description, the method comprising:
   generating or identifying an execution trace for the executable binary file; and
   operating, based on the execution trace, a transformer model that generates a human language program description of the execution trace;
   wherein the execution trace includes a program counter sequence and the transformer model includes a first embedder that generates an embedding representation of the program counter sequence.

2. The method of claim 1, wherein the execution trace further includes an executed instruction sequence and the transformer model includes a second embedder that generates an embedding representation of the executed instruction sequence.

3. The method of claim 2, wherein the executed instruction sequence includes operation codes for machine code instructions executed in executing the executable binary file.

4. The method of claim 2, wherein the execution trace further includes a state of relevant variables.

5. The method of claim 4, wherein the state of relevant variables includes values of variables input into instructions of the executed instruction sequence.

6. The method of claim 1, further comprising reverse engineering the executable binary file based on the human language program description.

7. The method of claim 1, further comprising training the transformer model using a training dataset comprising (execution trace, program description) pairs.

8. A method for executable binary file description, the method comprising:
   generating or identifying an execution trace for the executable binary file;
   operating, based on the execution trace, a transformer model that generates a human language program description of the execution trace; and
   training the transformer model using a training dataset comprising (execution trace, program description) pairs;
   wherein the program description of the (execution trace, program description) pairs are comments from program code used to generate the executable binary file.

9. The method of claim 8, wherein the comments are function level comments, program level comments, or a combination thereof.

10. A non-transitory machine-readable medium including instructions that, when executed by a machine, cause the machine to perform operations for executable binary file description, the operations comprising:
   generating or identifying an execution trace for the executable binary file; and
   operating, based on the execution trace, a transformer model that generates a human language program description of the execution trace;
   wherein the execution trace includes a program counter sequence and the transformer model includes a first embedder that generates an embedding representation of the program counter sequence.

11. The non-transitory machine-readable medium of claim 10, wherein the execution trace further includes an executed instruction sequence and the transformer model includes a second embedder that generates an embedding representation of the executed instruction sequence.

12. The non-transitory machine-readable medium of claim 11, wherein the executed instruction sequence includes operation codes for machine code instructions executed in executing the executable binary file.

13. The non-transitory machine-readable medium of claim 12, wherein the execution trace further includes a state of relevant variables.

14. The non-transitory machine-readable medium of claim 11, wherein the execution trace further includes a state of relevant variables.

15. The non-transitory machine-readable medium of claim 14, wherein the state of relevant variables includes values of variables input into instructions of the executed instruction sequence.

16. A system comprising:

processing circuitry;

memory including instructions that, when executed by the processing circuitry, cause the processing circuitry to perform operations for executable binary file description, the operations comprising:

generating or identifying an execution trace for the executable binary file; and operating, based on the execution trace, a transformer model that generates a human language program description of the execution trace;

wherein the operations further comprise reverse engineering the executable binary file based on the human language program description.

17. The system of claim 16, wherein the operations further comprise training the transformer model using a training dataset comprising (execution trace, program description) pairs.

18. The system of claim 17, wherein the program description of the (execution trace, program description) pairs are comments from program code used to generate the executable binary file, wherein the comments are function level comments, program level comments, or a combination thereof.

19. The system of claim 16, wherein the program description of the (execution trace, program description) pairs are comments from program code used to generate the executable binary file, wherein the comments are function level comments, program level comments, or a combination thereof.

* * * * *